(12) United States Patent
Heydecke et al.

(10) Patent No.: US 7,662,266 B2
(45) Date of Patent: *Feb. 16, 2010

(54) DEVICE AND METHOD FOR REGENERATING AN ELECTROLESS METAL PLATING BATH

(75) Inventors: Jens Heydecke, Berlin (DE); Masanori Muranushi, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 875 days.

This patent is subject to a terminal disclaimer.

(21) Appl. No.: 10/524,737

(22) PCT Filed: Aug. 14, 2003

(86) PCT No.: PCT/EP03/09030

§ 371 (c)(1),
(2), (4) Date: Feb. 16, 2005

(87) PCT Pub. No.: WO2004/020698

PCT Pub. Date: Mar. 11, 2004

(65) Prior Publication Data

US 2005/0241942 A1    Nov. 3, 2005

(51) Int. Cl.
*B01D 61/44* (2006.01)
(52) U.S. Cl. .............. 204/522; 204/523; 204/633; 204/634
(58) Field of Classification Search ............ 204/522, 204/523, 633, 634
See application file for complete search history.

(56) References Cited

U.S. PATENT DOCUMENTS

| | | | |
|---|---|---|---|
| 3,764,503 A * | 10/1973 | Lancy et al. ............ | 204/520 |
| 5,221,328 A | 6/1993 | Bishop et al. | |
| 5,328,616 A | 7/1994 | Martyak et al. | |
| 5,419,821 A | 5/1995 | Vaughan | |
| 5,874,204 A * | 2/1999 | Sugawara et al. ........ | 430/399 |

(Continued)

FOREIGN PATENT DOCUMENTS

DE    43 10 366 C1    10/1994

(Continued)

OTHER PUBLICATIONS

Yoshio Kuboi, Okuno Chemical Industries Co., Ltd. "Extension of Bath Life by Electrodialysis Method at Electroless Nickel Plating Bath," Electroless Nickel '89, pp. 16-1 through 16-15.

(Continued)

*Primary Examiner*—Arun S Phasge
(74) *Attorney, Agent, or Firm*—Frank J. Bonini, Jr.; John F. A. Earley, III; Harding, Earley, Follmer & Frailey, P.C.

(57) ABSTRACT

In regenerating an electroless metal plating bath by electrodialysis, it has been found that the metal of the metal plating bath deposits in the electrolysis arrangement. To overcome this problem, an improvement to prior art regenerating devices is suggested, said improvement consisting in providing main cation exchangers for removing ions of this metal from a concentrate fluid. The main cation exchangers are coupled to the concentrate compartments of the electrolysis arrangement in such a manner that the concentrate fluid flowing through the concentrate compartments is allowed to pass through the main cation exchangers and to be recirculated back into the concentrate compartments.

18 Claims, 2 Drawing Sheets

U.S. PATENT DOCUMENTS

Figure 1:
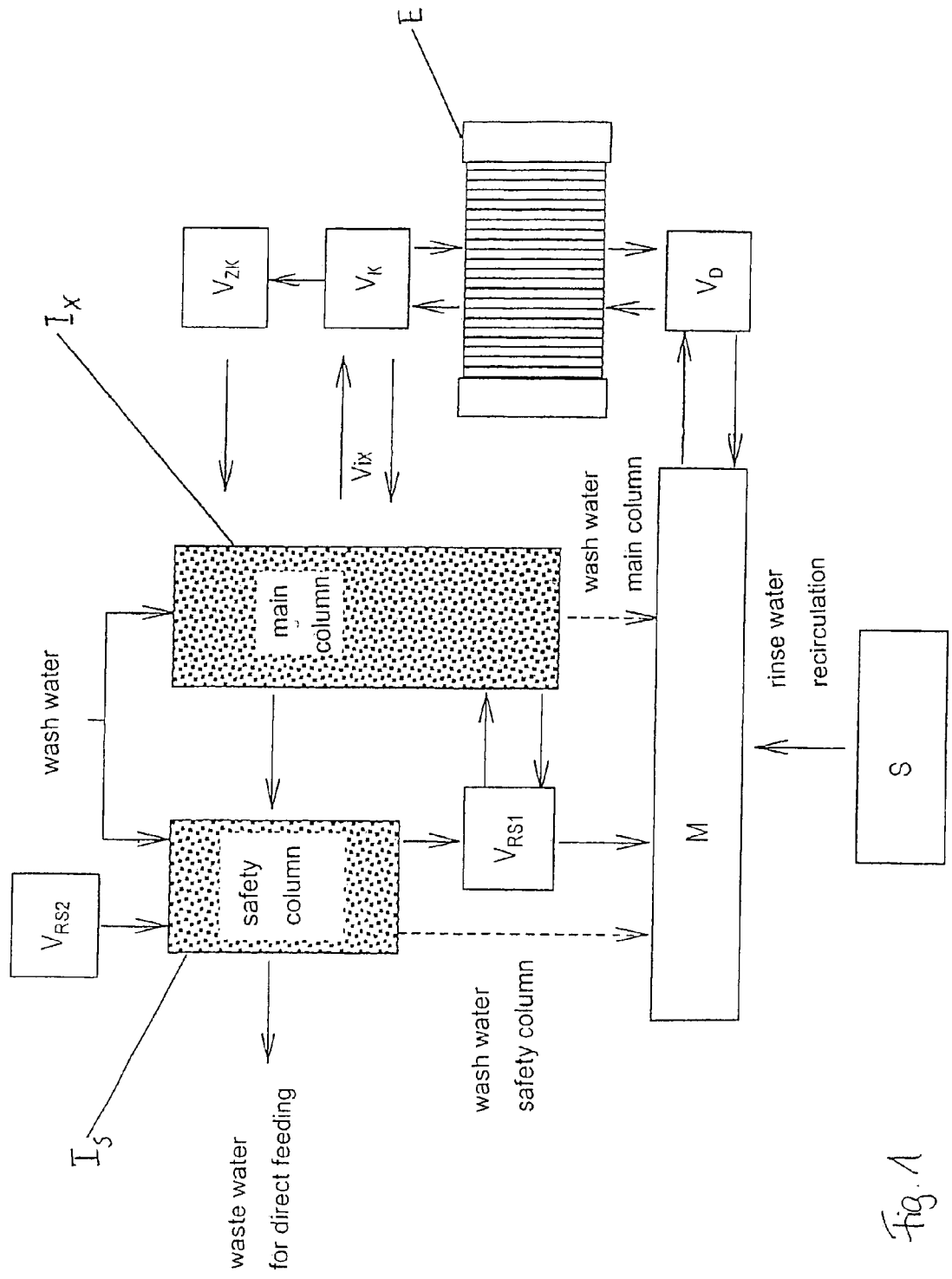
Figure 1:
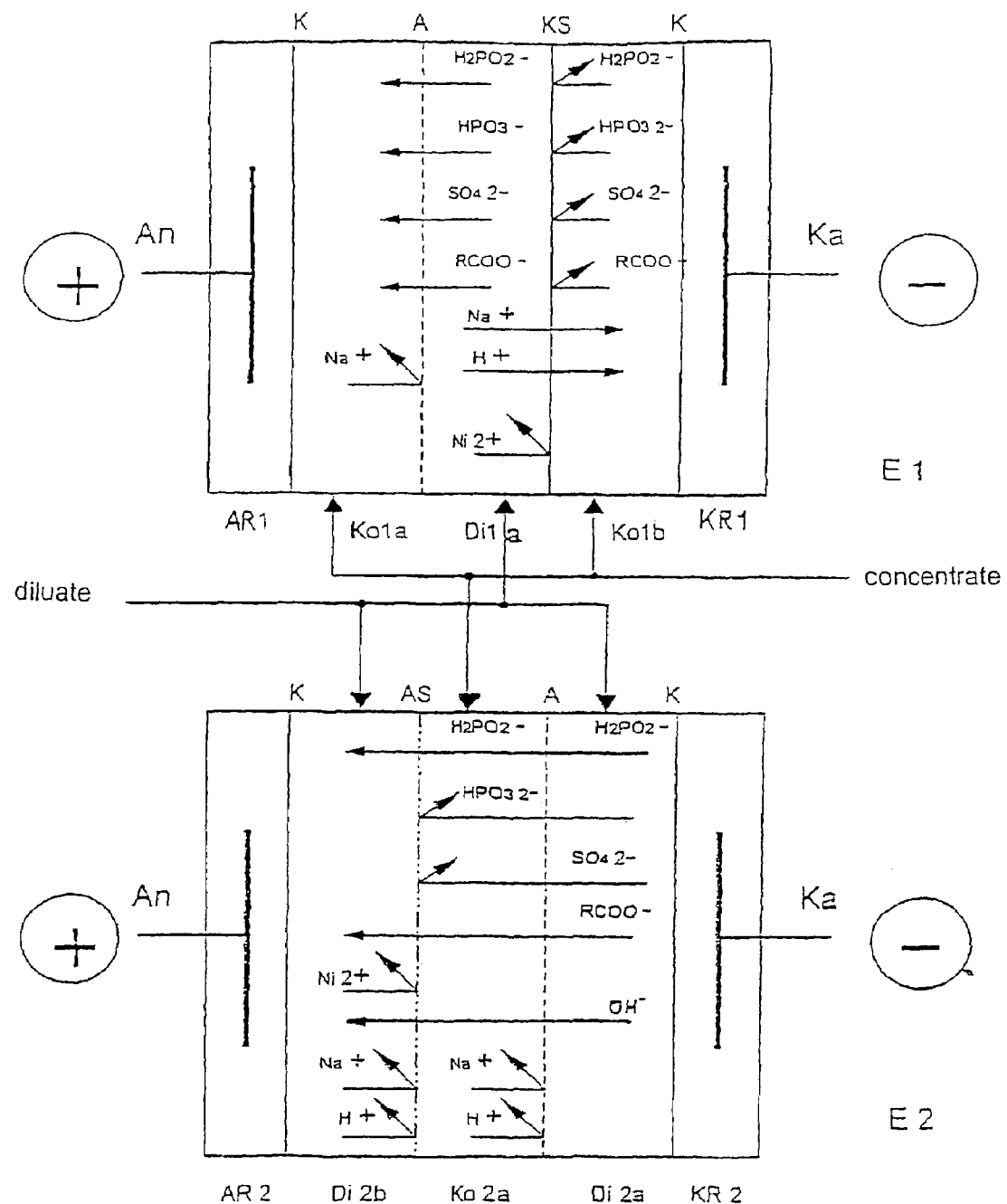

| | | |
|---|---|---|
| 6,245,389 B1 | 6/2001 | Horikawa et al. |
| 6,294,066 B1 * | 9/2001 | Mani .......................... 204/523 |
| 6,379,517 B1 * | 4/2002 | Heydecke et al. ........... 204/522 |

FOREIGN PATENT DOCUMENTS

| | | |
|---|---|---|
| DE | 198 51 180 C1 | 4/2000 |
| DE | 198 49 278 C1 | 7/2000 |
| EP | 0 787 829 A1 | 8/1997 |
| FR | 2 189 523 | 1/1974 |
| WO | WO 94/12439 A1 | 6/1994 |
| WO | WO 00/23637 * | 4/2000 |

OTHER PUBLICATIONS

C.D. Lacovangelo, "Continuous In-Situ Regeneration of Electroless Nickel Baths During Powder Plating" Plating and Surface Finishing, Sep. 1995, pp. 77-82.

Database Compendex [Online] Engineering Information, Inc. New York, NY; US Renz R P et al. "In-process recycling of a hexavalent chromium plating bath" XP002260386 Database accession No. EIX99454777298, Jun. 1999, 1 page.

Database Compendex [Online] Engineering Information, Inc. New York, NY; US Renz R P et al. "In-process recycling of a hexavalent chromium plating bath" XP002260386 Database accession No. EIX99454777298, Jun., 1999, 1 page.

* cited by examiner

DEVICE AND METHOD FOR REGENERATING AN ELECTROLESS METAL PLATING BATH

The invention relates to a device and a method for regenerating an electroless metal plating bath, said metal plating bath more specifically containing hypophosphite. The invention more specifically serves to regenerate baths intended for the electroless deposition of a nickel layer, more specifically of a nickel-phosphorus layer, by electrodialysis.

The electroless plating on substrates of metals and alloys is an autocatalytic process by which metal ions in solution are reduced to metal by means of a reducing agent contained in the solution and are deposited onto a suitable substrate. Other components such as phosphorus are often incorporated in the layer.

Usually, such type of method is used for depositing metals such as nickel, copper, cobalt, palladium, platinum and gold onto a substrate. In most cases, the reducing agents used are sodium hypophosphite, sodium boron hydride or dimethyl amino borane.

As compared to the conventional metal electroplating methods used for depositing metal, the electroless deposited layers offer a series of advantages that include homogenous coating distribution, advantageous mechanical properties and high corrosion resistance.

By way of example, the method in accordance with the invention will be described herein after for depositing a nickel-phosphorus layer using hypophosphite.

The method can also be utilized for other electroless metal plating processes, though:

The essential process in electroless nickel plating is represented by the following equation:

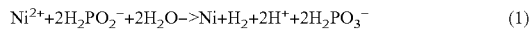

$$Ni^{2+}+2H_2PO_2^-+2H_2O \rightarrow Ni+H_2+2H^++2H_2PO_3^- \quad (1)$$

Accordingly, during electroless nickel plating, dissolved nickel ions and the hypophosphite reducing agent are permanently used up with the concentration of the oxidation product orthophosphite ($H_2PO_3^-$, $HPO_3^{--}$) increasing. In the bath, the nickel and hypophosphite concentration must be kept within a narrow range. These constituents must therefore continuously be replenished. The metal ions are replenished in the form of salts, leaving the bath enriched in interfering anions such as sulfate.

Since the reducing agent and the salts containing the nickel ions also form reaction products during the plating reaction, said reaction products accumulating in the plating bath, the useful life of the bath is inevitably limited. The bath age is usually indicated in Metal Turnover (MTO). 1 MTO is achieved once the entire amount of the normal initial metal concentration has been deposited from one unit of volume. After usually 6-10 MTO, the interfering substances have reached such a high concentration that the quality and deposition rate of the metal are no longer within tolerable ranges. According to prior art, these baths must then be discarded and a new bath must be prepared.

The need for discarding baths and for preparing new ones involves high costs and increases the environmental impact. Various methods have therefore been proposed for extending the useful life of electroless metal plating baths.

U.S. Pat. No. 5,221,328 describes a method by means of which, in a nickel-phosphorus plating bath, orthophosphite is caused to precipitate in the form of a metal salt and is allowed to be removed for the purpose of extending the useful life of an electroless nickel bath. Yttrium and lanthanides may be employed as precipitating agents. The chemicals used for the purpose are quite expensive, though. Furthermore, constituents of these additives, which remain in solution in the bath, may affect the quality of the metal coatings.

In "Plating and Surface Finishing", September 1995, pages 77-82, C. D. Iacovangelo suggests to prevent the nuisance of nickel orthophosphite precipitates by adding complexing agents. The concentration of dissolved free nickel ions is reduced as a result thereof.

In the ENVIRO CP method of Martin Marietta, U.S.A, the interfering constituents are removed by adsorption onto ion exchange resins. For complete removal and regeneration of the plating bath, a complicated method necessitating several different ion exchange columns and tanks for various processing fluids is performed.

Another possibility for regenerating electroless nickel baths consists in a method making use of electrodialysis. In the method using electrodialysis, charged ions are transported (transferred) in an electric field through a permselective ion exchange membrane so that the ions of active substances can be suitably separated from the ions of interfering substances.

Y. Kuboi and R. Takeshita describe a method using electrodialysis for removing the undesirable bath constituents (Electroless Nickel Conference 1989, Proceedings, Prod. Finishing Magazine, 1989, pages 16-1 through 16-15). By this method, the electroless nickel bath is passed through an electrodialysis cell in the form of what is termed a diluate. For this purpose, on the anode side, the diluate compartment in the electrodialysis cell is separated from the anode compartment contacting the anode by an anion exchange membrane and on the cathode side from the cathode compartment contacting the cathode by a cation exchange membrane. These last two compartments are also termed concentrate compartments. The undesirable sulfate and orthophosphite ions in the plating bath are transferred into the anode compartment and the undesirable sodium ions, which originate from the sodium hypophosphite utilized, into the cathode compartment. Laboratory tests however showed that not only the undesirable sulfate, orthophosphite and sodium ions are transferred to the concentrate compartments, but the bath constituents that are important for the plating method as well, namely the nickel and hypophosphite ions and the organic complexing agents (mostly carboxylic acids or the anions thereof).

DE 43 10 366 C1 describes a method for regenerating electroless nickel-phosphorus baths by electrodialysis. For this purpose, the nickel-phosphorus bath to be regenerated is passed through a compartment in an electrodialysis cell, said compartment being separated from the adjacent compartments by an anion exchange membrane both on the side of the anode and on the side of the cathode (diluate compartment). By applying an electric field, ortho- and hypophosphite ions are transferred to the concentrate compartment located with the anode side turned towards the diluate compartment. Next, this solution is delivered to the cathode compartment which contacts the cathode. From there, hypophosphite is allowed to be transferred back into the diluate compartment while orthophosphite is reduced to hypophosphite at the cathode, with the thus obtained hypophosphite being described to be transferred next into the diluate compartment. Tests however showed that this reduction reaction does not happen as a matter of fact. It further suggests to connect in parallel a plurality of the cells mentioned. This cell is not capable of overcoming the drawback inherent to the method described by Y. Kuboi and R. Takeshita. This solution is furthermore enriched in sulfate and sodium ions.

U.S. Pat. No. 5,419,821 also describes an electrodialytic process for regenerating an electroless metal plating bath. In a manner similar to that described in DE 43 10 366 C1, hypophosphite and orthophosphite are transferred through an anion exchange membrane to a concentrate compartment located on the anode side and are removed as a result thereof. In this case as well, the concentrate solution on the anode side is transferred to the cathode compartment in order to allow hypophosphite to return from there to the diluate compartment. By addition of magnesium or calcium salts to the solution that is circulated across said compartment, orthophosphite is precipitated, thus being removed from the overall process. The disadvantage thereof however is that interfering sodium and sulfate ions cannot be removed from the nickel bath solution.

In an effort to overcome the drawbacks of the methods described herein above, EP 0 787 829 A1 suggests a method of regenerating electroless nickel-phosphorus baths by electrodialysis, with the method being utilized in two different variants. In either of the two variants, this method is performed discontinuously. The one variant constitutes a two-stage method by which the spent plating solution is first conducted into the diluate compartment of an electrodialysis cell that is defined against two concentrate compartments by an anion exchange membrane on the side facing the anode and by a monoselective cation exchange membrane on the side facing the cathode. Monoselective ion exchange membranes differ from normal ion exchange membranes in that they allow singly charged ions to pass through, not however multiple charged ions. In the first stage of the process, ions of sodium, hypophosphite, orthophosphite, sulfate and carboxylic acid anions are transferred into the neighbouring compartments whereas the nickel ions remain in the diluate compartment. Next, the respective solutions are conducted into a second electrodialysis cell accommodating, between two diluate compartments, a concentrate compartment that is separated from these diluate compartments by a monoselective anion exchange membrane on the anode side thereof and by a cation exchange membrane on the cathode side thereof. In this event, the anions of hypophosphite and carboxylic acid and the cations of sodium are transferred back into the diluate compartment, not however the ions of orthophosphite and sulfate. As a result, the ions of orthophosphite and of sulfate are removed, not however the sodium ions. Since charge balance must be ensured in either of the various stages of the process, it is not possible to remove the total amount of the ions of orthophosphite and sulfate since the portion of anionic counter ions that corresponds to the sodium ions remaining in the diluate compartment must also remain in the diluate compartment. This substantially affects removal efficiency.

In the second variant, which is conceived as a one-stage method, the solution of the bath is filled into the cathode compartment of an electrodialysis cell consisting of three electrolyte compartments, the central compartment thereof being separated from the other compartments by a monoselective anion exchange membrane on its anode side and by a monoselective cation exchange membrane on its cathode side. The solution contained in the anode compartment is conducted into the cathode compartment. The solution of the bath is first introduced into the cathode compartment. Ions of hypophosphite and of orthophosphite are described to be transferred into the central compartment. This seems impossible though since a cation exchange membrane is disposed between the two compartments. For this reason, it is not clear how the method can be performed.

DE 198 49 278 C1 further describes a method and a device for electrodialytically regenerating an electroless metal plating bath containing a reducing agent in the form of hypophosphite ions that ensure a constant low percentage of interfering ions in the metal plating bath. The user of this invention can extend almost ad lib the useful life of the baths. In practice, far more than 200 MTO have been achieved heretobefore. In addition to extending the useful life, they also ensure that consistent high quality coatings be deposited. The suitable arrangement of the anion exchange membranes and of the monovalent permselective anion exchange membranes described in DE 198 49 278 C1 permits to remove the monovalent anions (more specifically the hypophosphite) from the circuit of the waste substances and to recirculate them back into the circuit of the active substances.

The known methods and devices suffer from various different disadvantages:

1. Depending on the type of membrane used, the amount of metal ions from the circuit of active substances (diluate) lost to the circuit of waste substances (concentrate) can be as much as 10% of the amount deposited in the metal plating bath. Active substances get lost as a result thereof.

2. The drop-out current contains a considerable amount of metal ions such as nickel ions which accordingly requires further waste treatment expense and leads to the formation of a corresponding amount of metal slurry.

3. The major drawback of the known method and device is that undesirable metal precipitates form within the regeneration device. On the one side, this reduces the availability of the plant which inevitably has to be subjected to cleaning cycles (metal stripping) and on the other side causes damages and an efficiency loss to the plant.

It is therefore an object of the present invention to avoid the disadvantages of the known methods and devices and more specifically to find a method and a device permitting to regenerate metal plating baths more specifically comprising a hypophosphite reducing agent. The invention is more specifically intended to achieve that the active substances (metal ions, reducing agent, complexing agent) be largely maintained in the circuit of active substances and that the interfering substances (reaction products, inerts) be removed to the largest possible extent from the circuit of active substances.

In overcoming the problem, the invention provides the device for regenerating an electroless metal plating bath according to claim 1 and the method for regenerating an electroless metal plating bath according to claim 8. Preferred embodiments of the invention are recited in the subordinate claims.

Any electrodialysis arrangement/s, diluate compartment/s, concentrate compartment/s, main cation exchanger/s, anion exchanger/s, ion exchange membrane/s, cathode/s, anode/s, current supply/s, collecting tank/s, regenerant fluid vessel/s, service reservoir/s, safety cation exchanger/s or the like is to be construed in the following description of the invention and in the patent claims as one or several such elements.

The device and the method in accordance with the invention mainly serve to regenerate by electrodialysis an electroless metal plating bath that more specifically contains hypophosphite, for example a bath for depositing layers of nickel, cobalt, copper, palladium, platinum or gold. The device and the method are more specifically suited for electrodialytically regenerating electroless nickel baths. More specifically, the baths adapted to be regenerated in accordance with the invention may comprise a hypophosphite reducing agent. Therefore, phosphorus can also be deposited as a constituent component of the layer. All of the hypophosphite salts and the free acid $H_3PO_2$ may be employed as hypophosphite. The salts utilized may more specifically be utilized in the form of alkali salt, alkaline earth salt and ammonium salt.

The device in accordance with the invention comprises electrodialysis arrangements each comprising diluate compartments for receiving the metal plating bath, concentrate compartments for receiving a concentrate fluid serving to incorporating the interfering substances removed from the metal plating bath, said concentrate compartments each being separated from the diluate compartments by ion exchange membranes, and anodes and cathodes. Further, the device additionally comprises main cation exchangers for removing metal ions from the concentrate fluid, said cation exchangers communicating with the concentrate compartments in such a manner that the concentrate fluid is passed through the main cation exchangers and may be circulated back to the concentrate compartments. For electrodialytic treatment, the metal plating bath may be passed through the diluate compartments in the electrodialysis arrangements and the concentrate fluid through the concentrate compartments in the electrodialysis arrangements.

In addition to the electrodialysis arrangements an ion exchanger system (main cation exchanger) is thus coupled in the inventive manner to the regenerating system so as to allow concentrate fluid to flow through the main cation exchanger. The concentrate fluid is supplied to one or several main columns (main cation exchangers) comprising the ion exchanger resin. The ion exchanger resin is a cation exchanger resin. Such type resins are commercially available, for example from Bayer, Germany (Lewatit® types). The cation exchanger resin binds the metal ions, for example nickel or copper ions, and exchanges them for $H_3O^+$— or for sodium ions. Once the concentrate fluid has been passed through the main cation exchanger, it is circulated back to the concentrate compartments of the electrodialysis arrangement.

Due to the invention, a loss of metal ions from the circuit of active substances (diluate) to the circuit of waste substances (concentrate) will not lead to the disadvantages described. By removing the metal ions from the concentrate, the following advantages are achieved:

1. By removing the metal ions from the concentrate by means of cation exchange, the metal ions, for example the nickel ions, concentrate in the main cation exchanger. As a result thereof, the metal ions transferred to the concentrate can be recycled and be recirculated back into the circuit of the active substances. The loss of active substances is thus minimized.

2. By removing the metal ions from the concentrate, the cost of waste water treatment may be reduced as well since the treatment using the main cation exchanger is much less complicated than a conventional waste water treatment which additionally needs considerable amounts of chemicals for precipitating the metal ions from the bath. In many cases, it is absolutely impossible to remove the metal ions from the concentrate solution as they may contain considerable amounts of complexing agents. Removal of the metal ions from the concentrate minimizes the environmental impact.

3. By removing the metal ions from the concentrate, the metal is further prevented from precipitating by plating in the regeneration device. The availability of the plant is considerably increased as a result thereof as otherwise inevitable cleaning cycles (metal stripping) will be necessary. The plant is moreover subjected to less wear.

It has been tested whether the concentrate can be enriched in stabilizing agents in order to at least delay plating of the electrodialysis arrangements. Usually, such type stabilizing agents are added to electroless metal plating baths in an effort to prevent metal from undesirably precipitating in the bath tank and on the inserts therein. For nickel baths, low concentrations of lead compounds are used for example.

It has been found out however that stabilization is disadvantageous because part of these substances gets into the diluate where they can negatively affect the quality and deposition performance of the bath. This is particularly true for baths that are stabilized at low levels and that serve to deposit nickel layers with high phosphorus content. The use of these stabilizing agents is also disadvantageous because they make waste water treatment more difficult.

The invention also permits to profitably regenerate baths with low throughput as they are currently used in practice by means of electrodialysis. As a result thereof the quality of the layers can be kept on a constant and optional level in these cases as well.

Preferably, the method can be performed continuously, i.e., regeneration is carried out without any interruption for maintenance works for a very long period of time, for example for one or several months.

The concentrate fluid in the electrodialysis arrangement is conducted through the ion exchanger in a manner in accordance with the invention in order to remove the metal ions that have entered the concentrate fluid. The metal concentration that builds up in the concentrate circuit can be regulated by the size of the volume stream $V_{ix}$ of concentrate fluid flowing across the main cation exchanger. In theory, as metal ions are permanently transferred from the diluate fluid to the concentrate fluid, an infinitely large volume stream $V_{ix}$ is needed in order to cause the concentration of the metal ions in the concentrate fluid to reduce to nearly zero. Therefore, the concentration of the metal ions is adjusted so as to reliably prevent metal from plating the electrodialysis arrangement. The nickel ion concentration is less than 800 mg/l, the upper limit of the still tolerable nickel concentration depending on the temperature of the concentrate fluid in the electrodialysis arrangement, on the pH value, on the concentration of the reducing agents (hypophosphite) and on other parameters and being adapted to be determined separately by way of experiment.

In a particularly advantageous embodiment, the device in accordance with the invention comprises collecting tanks that communicate with the concentrate compartments and with the main cation exchangers in such a manner that the concentrate fluid is allowed to circulate in a first circuit between the concentrate compartments and the collecting tanks and in a second circuit between the collecting tanks and the main cation exchangers.

This arrangement permits the formation of two fluid circuits that can be controlled independent of each other. On the one hand, the volume streams flowing between the electrodialysis arrangements and the collecting tank on the one side and between the collecting tank and the main cation exchanger on the other side, the latter being referred to as $V_{ix}$, can be adjusted independent of each other. $V_{ix}$ may for example be adjusted so as to be much smaller than the volume stream flowing between the electrodialysis arrangements and the collecting tank. The concentration of the metal ions in the concentrate fluid can be directly influenced in a simple manner by adjusting the ratio of these volume streams. On the other hand, if necessary, the temperatures of the volume streams can also be set to different values.

A device in accordance with the invention that has the following features has been found to be advantageous:

a) a first electrodialysis arrangement alternatingly comprising first concentrate compartments and first diluate compartments as well as cathodes and anodes, each of said diluate compartments being separated from a respective neighbouring concentrate compartment located on the cathode side of the diluate compartment by a monoselective cation exchanger membrane and from a respective neighbouring concentrate compartment located on the anode side of the diluate compartment by an anion exchanger membrane, b) a second electrodialysis arrangement alternatingly comprising second diluate compartments and second concentrate compartments as well as cathodes and anodes, each of said concentrate compartments being separated from a respective neighbouring diluate compartment located on the cathode side of the concentrate compartment by an anion exchanger membrane and from a respective neighbouring diluate compartment located on the anode side of the concentrate compartment by a monoselective anion exchanger membrane.

The metal plating bath is concurrently conducted through all the first and second diluate compartments in the two electrodialysis arrangements that are hydraulically connected in parallel. Likewise, the concentrate fluid is concurrently conducted through all the first and second concentrate compartments in the two electrodialysis arrangements that are hydraulically connected in parallel.

The concentrate compartments and the diluate compartments are alternatingly arranged in the two electrodialysis arrangements.

Further, c) current supplies for the cathodes and the anodes of the first and second electrodialysis arrangements are provided for in this device.

In a very simple embodiment, the electrodialysis arrangement is provided with the following arrangement features:

a) a first electrodialysis arrangement, comprising two first concentrate compartments and one first diluate compartment disposed therein between, said compartments being employed as electrolyte compartments, with the diluate compartment being separated on the cathode side thereof from one of the concentrate compartments by a monoselective cation exchanger membrane and on the anode side thereof from the other concentrate compartment by an anion exchanger membrane, b) a second electrodialysis arrangement, comprising two second diluate compartments and one second concentrate compartment disposed therein between, said compartments being employed as electrolyte compartments, with the concentrate compartment being separated on the cathode side thereof from one of the diluate compartments by an anion exchanger membrane and on the anode side thereof from the other diluate compartment by a monoselective anion exchanger membrane, c) at least one cathode and at least one anode being provided in each electrodialysis arrangement and d) a current supply for the cathodes and the anodes.

Instead of but three electrolyte compartments (diluate compartments, concentrate compartments), more than three electrolyte compartments may be provided for in each electrodialysis arrangement, the respective ones of the diluate and concentrate compartments being disposed alternatingly and being separated by ion exchanger membranes in compliance with the above mentioned requirement. With the ion exchanger membranes having given dimensions, a sufficiently large exchange surface for the spent metal plating bath is thus made available in the membranes. The larger this exchange surface, the faster and more efficient the regeneration process of the bath. Therefore, in an optimum configuration of the regeneration array, a plurality of diluate and concentrate compartments is disposed in alternating sequence in both the first and the second electrodialysis arrangement. Two stacks of electrolyte cells through which the diluate fluid is conducted across the diluate compartments and the concentrate fluid across the concentrate compartments are thus obtained. In principle, the two electrodialysis stacks need not have the same number of electrolyte compartments. It may for example be advantageous to provide the first electrodialysis arrangement with a greater number of diluate and concentrate compartments than the second electrodialysis arrangement.

Through the special arrangement of the ion exchanger membranes, the first concentrate compartments in the first electrodialysis arrangement are defined by anion exchanger membranes on the cathode side of this compartment arid by monoselective cation exchanger membranes on the anode side of this compartment. The anode and the cathode are disposed on the end faces of the electrodialysis stack. Unlike the given sequence of membranes separating the respective compartments, the electrolyte compartments contacting the cathode and the anode are separated from the adjacent electrolyte compartments by cation exchange membranes. These outer electrolyte compartments hold an electrochemically inert conducting salt solution that is delivered across the two compartments in the circuit, for example a sodium sulfate solution. Undesirable electrode reactions, which would destroy the electrodes or lead to the formation of further undesirable reaction products on the electrodes, are thus prevented from happening in these compartments.

Likewise, the second concentrate compartments in the second electrodialysis arrangement are bounded by anion exchange membranes on the cathode side thereof and by monoselective anion exchange membranes on the anode side thereof. Again, one anode and one cathode are disposed on the end sides of this second electrodialysis stack. Unlike the given sequence of membranes separating the diluate compartments and the concentrate compartments, the electrolyte compartments contacting the cathode and the anode are separated from the adjacent electrolyte compartments by cation exchange membranes. In this second case as well, suited inert solutions are contained in the cathode and in the anode compartment so that undesirable electrode reactions are prevented from happening.

The surface ratio of the normal anion exchange membranes to the monoselective anion exchange membranes in the two electrodialysis stacks and the pH value of the solution conducted through the concentrate compartments (preferably about 8.5) determine the degree of loss of anionic active substances, meaning of hypophosphite and carboxylic acid anions.

The first electrodialysis arrangement and the second electrodialysis arrangement can be combined in one common electrodialysis stack and may be disposed in such a manner that one cathode is disposed on one end face of the common electrodialysis stack and that one anode is disposed on the other end face thereof. For this purpose, the respective stacks are not electrically isolated from each other. For this purpose there is rather provided an anion exchange membrane on the interface between the two stacks for separating the last concentrate compartment in the first electrodialysis arrangement on its cathode side from the last diluate compartment in the second electrodialysis arrangement on its anode side. In this case, the cathode compartment provided for on the last electrolyte compartments and the corresponding anode compartment as well as the associated electrodes are dispensed with. Accordingly, but one cathode compartment and one anode compartment as well as one cathode and one anode are provided for on the end faces of the stack in this case.

Further, in another embodiment, the first electrodialysis arrangement and the second electrodialysis arrangement can be combined into one common electrodialysis stack in such a manner that the electrolyte compartments in the electrodialysis arrangements that are turned toward the cathode are oriented toward the respective other stack of electrodialysis cells. One common cathode is disposed between the two electrodialysis arrangements and one anode is disposed on either end face of the common electrodialysis stack. This combination has the advantage that only one stack must be realized. In this case, two current supplies are provided, namely one current supply for the cathode and the one anode and another current supply for the cathode and the other anode. The electric circuits of the two electrodialysis arrangements can of course also be connected in parallel so that one current supply will do.

In an alternative embodiment, the various electrolyte compartments are arranged in a reverse sequence. In this case, the electrolyte compartments in the electrodialysis arrangements that are turned toward the anode are oriented toward the respective other stack of electrodialysis cells. One common anode is disposed between the two electrodialysis arrangements and one cathode is disposed on either end face of the common electrodialysis stack.

The spent bath solution, which, in addition to the active substances of the bath, meaning ions of hypophosphite, carboxylic acid and nickel, also contains interfering concomitant substances such as ions of orthophosphite, sulfate and sodium, is supplied simultaneously to all the diluate compartments of the two electrodialysis arrangements that are hydraulically connected in parallel. In the first electrodialysis arrangement, all of the anions are transferred from the diluate compartments into the concentrate compartments that are disposed on the anode side of the diluate compartments and the sodium ions are transferred to the concentrate compartments that are disposed on the cathode side of the diluate compartments, with the nickel ions remaining in the diluate compartments. In the second electrodialysis arrangement, only the monovalent anions, that is the ions of hypophosphite and carboxylic acid, are transferred from the concentrate compartments into the diluate compartments located on the anode side of the concentrate compartments, the cations held in the concentrate compartments and the bivalent anions, namely the ions of orthophosphite and sulfate, remaining in these compartments in this case.

By utilizing, on the cathode side of the diluate compartment of the first electrodialysis arrangement, a monoselective cation exchange membrane, sodium ions are virtually selectively transferred from the diluate compartment into the concentrate compartment. Except for small losses, the special arrangement of the membranes does not allow nickel ions to pass from the diluate compartment into the concentrate compartment. By further utilizing, in both electrodialysis arrangements, on the anode side of the diluate compartment, an anion exchange membrane, not only hypophosphite but orthophosphite and sulfate as well are transferred from the diluate compartment into the concentrate compartment. The loss of ions of hypophosphite and carboxylic acid lost to the diluate compartment is selectively compensated for in disposing, in the second electrodialysis arrangement, a monoselective anion exchange membrane on the anode side of the concentrate compartment so that these ions are selectively transferred from the concentrate compartment into the diluate compartment.

As a result, with the solution being continuously passed through the two electrodialysis arrangements, the ions of sodium, orthophosphite and sulfate are mainly removed from the spent solution whereas the active substances are retained therein. Accordingly, the method and the device in accordance with the invention permit to achieve the optimal efficiency in removing interfering bath constituents thus providing the solution of the problem the invention aimed at resolving.

Since the two electrodialysis arrangements are hydraulically operated in parallel and not in series, electroneutrality must be preserved for the transfer of ions within the entire arrangement only. Meaning, the amount of anionic substances passing across the membranes in the anodic direction needs only equal the amount of cationic substances passing the membranes in the cathodic direction with regard to the arrangement as a whole. The metal plating bath is permanently and continuously passed through the two electrodialysis arrangements so that, in continuous operation, a balance is maintained in which the interfering substances are being largely removed.

The concentrate fluid flows through the concentrate compartments. Said concentrate fluid is enriched in the interfering substances removed from the spent metal plating bath and carries entrained water. In order for the concentration of these interfering substances not to exceed a critical value, the concentrate fluid is diluted constantly or at least from time to time (intermittently). Moreover, it is possible to add sodium hydroxide to this fluid. This addition permits efficient separation of the orthophosphite ions from the hypophosphite ions in that the pH of the concentrate fluid is optimally adjusted to about 8.5 (formation of $HPO_3^{--}$ out of $H_2PO_2^-$).

When the device starts operation, the main cation exchangers are charged with $H_3O^+$ or with sodium ions, depending on the type of cation exchanger used. In operation, the main cation exchangers are gradually charged with metal ions. Once a certain charge, which may vary as a function of the type of exchanger used, of the main cation exchangers is achieved, the main cation exchangers will no longer adsorb further metal ions so that these can no longer be removed from the concentrate fluid. If necessary, operation must therefore be halted to regenerate the main cation exchangers.

Further, to regenerate the main cation exchangers, first regenerant fluid vessels are provided for holding regenerant fluid intended to regenerate the main cation exchangers, said vessels being coupled to the main cation exchangers. An acid, more specifically sulfuric acid, is preferably employed as a regenerant fluid. Using an acid, the main cation exchangers, which are charged with metal ions, are again charged with $H_3O^+$ ions, the metal ions being liberated into the regenerant fluid.

Service reservoirs for the concentrate fluid, which are coupled to the collecting tanks and the main cation exchangers, are further provided. Safety cation exchangers, which are coupled to the main cation exchangers for post-treatment of the concentrate fluid treated in the main cation exchangers, are also provided. Eventually, there are provided second regenerant fluid vessels for holding regenerant fluid intended for use in the regeneration of the safety cation exchangers.

The figures, which are indicated as follows, serve to explain the invention in closer detail.

FIG. 1 gives an overall schematic view of the device in accordance with the invention;

FIG. 2 gives a schematic view of the partial processes in a preferred electrodialysis equipment.

FIG. 1 illustrates a metal plating bath tank M that holds for example an electroless nickel bath containing a hypophosphite reducing agent. Rinse water can be transferred from a rinse water tank S to the metal plating bath tank M to compensate for evaporation loss.

The metal plating bath is circulated between the tank M and a diluate tank $V_D$. The volume stream amounts to 100 l/h for example. The bath is further circulated between the diluate tank $V_D$ and an electrodialysis equipment E, comprising two electrodialysis arrangements for example This volume stream amounts for example to 8 m³/h. In separating the volume streams flowing from the bath tank M to the diluate tank $V_D$ and from the diluate tank $V_D$ to the electrodialysis arrangements E, the metal plating bath, which in most cases is very hot (for example T=90° C.), can already be electrodialyzed with little cooling. This is achieved in that the volume streams flowing between the diluate tank $V_D$ and the electrodialysis arrangements E is much smaller than the one flowing between the bath tank M and the diluate tank $V_D$.

Diluate and concentrate compartments, which are shown schematically, are provided for in the electrodialysis arrangements E. This is denoted in FIG. 1 by the vertical partition through the schematically shown electrodialysis arrangements E, said partition being intended to illustrate that the electrodialysis arrangements E contain a stack of several diluate and concentrate compartments that are arranged alternatingly. Further, one anode is disposed on the one side and one cathode on the other side of the stack. A preferred embodiment of electrodialysis arrangements is shown in FIG. 2 (it will be described herein after).

The bath flows simultaneously through all of the diluate compartments as the diluate compartments are hydraulically connected in parallel. Concurrently, a concentrate fluid, which is preferably weakly alkaline and contains, in operation, transferred substances originating from the diluate fluid (for example ions of orthophosphite, sulfate, sodium), flows simultaneously through all of the concentrate compartments in the electrodialysis arrangements E, said compartments being hydraulically connected in parallel as well. The concentrate fluid also contains small amounts of transferred nickel ions originating from the metal plating bath.

In the electrodialysis equipment E, ions of orthophosphite, sulfate and sodium in particular are removed from the metal plating bath and enter the concentrate fluid. Small amounts of nickel and hypophosphite ions also pass into the concentrate fluid.

The concentrate fluid is circulated between the electrodialysis arrangements E and a collecting tank $V_K$.

The concentrate fluid flowing into the collecting tank $V_K$ is circulated in another fluid circuit to the main cation exchanger $I_X$ that is preferably configured to be tubular (in the form of a column).

The main cation exchanger column $I_X$ is filled with a cation exchanger material. The main cation exchanger $I_X$ is charged with nickel ions through the concentrate fluid flowing there through. Concurrently, $H_3O^+$ ions from the main cation exchanger $I_X$ are released to the concentrate fluid. Since the pH value of the concentrate fluid is permanently lowered as a result thereof, a base such as NaOH may be added.

The following devices are further provided.

The concentrate fluid can be temporarily stored in a separate service reservoir $V_{ZK}$. For this purpose, the service reservoir $V_{ZK}$ is coupled to the collecting tank $V_K$ and the main cation exchanger $I_X$. The concentrate fluid can be conducted from the collecting tank $V_K$ into the service reservoir $V_{ZK}$ and from there into the main cation exchanger $I_X$.

The main cation exchanger $I_X$ is further coupled to a first regenerant fluid vessel $V_{RS1}$. The first regenerant fluid tank $V_{RS1}$ serves to hold regenerant fluid. If necessary, the regenerant fluid can also be conducted directly into the metal plating bath, for example if the pH value of the bath is to be adjusted.

The main cation exchanger $I_X$ is further coupled to a safety cation exchanger $I_S$. Both the safety cation exchanger $I_S$ and the main cation exchanger $I_X$ contain cation exchanger material.

The safety cation exchanger $I_S$ is coupled to a second regenerant fluid vessel $V_{RS2}$. Said second regenerant fluid tank $V_{RS2}$ also serves to hold regenerant fluid.

Wash water can be conducted both into the main cation exchanger $I_X$ and into the safety cation exchanger $I_S$. Next, this wash water can be transferred into the metal plating bath.

In removing the nickel ions from the concentrate fluid flowing through the main cation exchanger $I_X$, the ion exchanger is charged with nickel ions. The ion exchanger will have to be regenerated upon capacity exhaustion thereof. This can be performed in the following manner:

Regeneration Step 1 (Displacement of the Concentrate Fluid):

In a first regeneration step, the concentrate fluid contained in the main cation exchanger $I_X$ is displaced by the regenerant fluid stored in the first regenerant fluid vessel $V_{RS1}$. The concentrate fluid is thereby recirculated back into the collecting tank $V_K$. For this purpose, the regenerant fluid is transferred from the first regenerant fluid vessel $V_{RS1}$ into the main cation exchanger $I_X$. This way of proceeding makes sure that the least possible amount of concentrate is introduced into the regenerant fluid. This method step can be automated by controlling the volume streams flowing from the first regenerant fluid vessel $V_{RS1}$ to the main cation exchanger $I_X$ and from there into the collecting tank $V_K$ through automated valve switching for a set time or for example through measuring the pH value at the output of the main cation exchanger $I_X$ to the collecting tank $V_K$. In the latter case, pH sensors detect whether the pH value of the concentrate fluid flowing from the main cation exchanger $I_X$ into the collecting tank $V_K$ is lowered below a predetermined lower pH command by the regenerant fluid "breaking through" the main cation exchanger $I_X$ when the concentrate fluid in the main cation exchanger $I_X$ is completely displaced by the regenerant fluid.

Regeneration Step 2 (Regeneration):

The metal ions bound to the ion exchanger resin of the main cation exchanger $I_X$ are adsorbed by the regenerant fluid. $H_3O^+$ ions, which are bound to the cation exchanger resin in lieu of the metal ions, occupy the linkage sites of the ion exchanger material for the metal ions. For regeneration, the regenerant fluid can be circulated once or several times through the main column $I_X$. While the regenerant fluid contacts the cation exchanger material in the main column $I_X$, the circulation of the concentrate fluid between the collecting tank $V_K$ and the main cation exchanger $I_X$ is interrupted. The cation exchanger resin can be heated in order to achieve faster regeneration of the main cation exchanger $I_X$.

Regeneration Step 3 (Displacement of the Regenerant Fluid):

Once regeneration is completed, the regenerant fluid is again driven out of the collecting tank $V_K$ by the concentrate fluid, the regenerant fluid being recirculated back into the first regenerant fluid vessel $V_{RS1}$. The advantage of this manner of proceeding is that the pH value of the concentrate fluid is not unnecessarily lowered through entrained regenerant fluid. Like the other method steps, this method step may also be automated in that the volume stream of concentrate fluid flowing from the collecting tank $V_K$ to the main cation exchanger $I_X$ ($V_{ix}$) and from there into the first regenerant fluid vessel $V_{RS1}$, is controlled through automated valve switching for a set time or for example through measuring the pH value at the transition between the main cation exchanger $I_X$ and the first regenerant fluid vessel $V_{RS1}$. In the latter case, pH sensors may also detect whether the pH value of the regenerant fluid flowing from the main cation exchanger $I_X$ is raised above a predetermined upper pH command by the concentrate fluid "breaking through" the main cation exchanger $I_X$ when the regenerant fluid in the main cation exchanger $I_X$ is completely displaced by the concentrate fluid.

In order to achieve a continuous manner of proceeding, several main cation exchangers $I_X$ may be provided, concentrate fluid flowing through said cation exchangers at different times. Through the main cation exchangers $I_X$ through which the concentrate fluid is not circulated is now circulated the regenerant fluid for regeneration thereof, the above mentioned method steps 1, 2 and 3 being preferably performed. Accordingly, two main cation exchangers $I_X$ may for example be provided for, the concentrate fluid being constantly circulated through the one exchanger for removing the metal ions from the concentrate fluid while the other one is being regenerated. Upon completion of regeneration, concentrate fluid may displace regenerant fluid in said second main cation exchanger $I_X$ according to method step 3, transferring it into the first regenerant fluid vessel $V_{RS1}$. Concurrently, the regenerant fluid can displace the concentrate fluid in the first main cation exchanger $I_X$ according to method step 1 so that said exchanger can be regenerated next.

To further optimize the process, the metal ion concentration in the concentrate fluid can be lowered further so that it can be directly fed into effluent collecting assemblies without having to be subjected to further waste water treatment.

The maximum concentration of the metal ions needed for this purpose must generally be below 1 ppm. The following further optional method steps serve this purpose.

Method Step 4 (Washing):

As water and ions are permanently transferred from the diluate compartments into the concentrate compartments of the electrodialysis equipment E and as the concentrate fluid is dosed with NaOH solution, the volume of the concentrate fluid steadily increases. Therefore, concentrate fluid from the electrodialysis arrangements E is collected in a service reservoir $V_{ZK}$, at least to the extent of this increase in volume, while the main cation exchanger $I_X$ is being charged (method step 6) and regenerated (method steps 1, 2 and 3). Said service reservoir $V_{ZK}$ is coupled to the collecting tank $V_K$ and to the main cation exchanger $I_X$.

In order to treat the concentrate fluid held in the service reservoir $V_{ZK}$ in such a manner that it may be directly fed to the effluent collecting assemblies, the metal concentration must be less than 1 ppm. If the concentrate fluid stored in the service reservoir $V_{ZK}$ were treated in the main cation exchanger $I_X$ directly after method step 3, it would not be possible to reliably achieve the low metal concentration of less than 1 ppm required because the main cation exchanger $I_X$ is still contaminated with concentrate fluid originating from the collecting tank $V_K$. In order to achieve the low metal concentration, the concentrate fluid in the main cation exchanger $I_X$ is displaced by wash water and transferred to the collecting tank $V_K$ after regeneration of the main cation exchanger $I_X$ (method step 2) and after the regenerant fluid has been driven out of the main cation exchanger $I_X$ by the concentrate fluid (method step 3).

The wash water originating from washing may either be added to the electroless metal plating bath to complement the volume thereof or be combined to the rinse waters for further processing during operation.

Method Step 5 (Final Treatment of the Concentrate Fluid):

After method step 4, the concentrate fluid stored in the service reservoir VZK is passed across the main cation exchanger $I_X$. Metal ions from the concentrate fluid are exchanged for $H_3O^+$ ions in the process.

Safety cation exchanger $I_S$, which are coupled to the main cation exchanger $I_X$ for post-treatment of the concentrate fluid treated in the main cation exchanger $I_X$, are further provided. After the concentrate fluid has been passed through the safety cation exchanger $I_S$, it contains metal ions in a concentration of less than 1 ppm so that it can be directly fed into effluent collecting assemblies.

Method Step 6 (Charging):

After the main cation exchanger $I_X$ has been regenerated, it can be coupled again to the collecting tank $V_K$. This method step can be performed either after method step 3—if the optional method steps 4 and 5 are not performed—or after method step 5. With concentrate fluid being again circulated from the collecting tank $V_K$ through the main cation exchanger $I_X$, the latter is again charged with metal ions. The charging process lasts for about 4-12 hours. The time needed depends on the design of the main cation exchanger $I_X$.

The above mentioned method sequence . . . -6-1-2-3-6- . . . or, as an alternative, . . . -6-1-2-3-4-5-6- . . . is periodically repeated for as many times as are needed for the metal salts present in the regenerant fluid to just no longer crystallize. For the regenerant fluid is enriched in metal salts due to its repeated utilization. In this case, the highest possible metal ion concentration is achieved. This maximum concentration can be sensed through the number of cycles or by means of a suited detector such as a photocell or a pH meter.

Once the maximum metal ion concentration is reached, the regenerant fluid is transferred in part or in whole to the regenerant fluid vessel $V_{RS1}$ from where it is fed to the metal plating bath tank M. The remaining regenerant fluid is enriched in fresh acid and adjusted to a suited pH value.

The safety cation exchanger $I_S$ merely serves to make sure that the conditions for feeding the fluid into the effluent collecting assemblies are met and is therefore only charged to a very little extent. As a result thereof, the regeneration cycles need only seldomly be performed or a quite small amount of ion exchanger resin only is needed in this column.

The regeneration of the safety cation exchanger Is mounted downstream is carried out in a manner analogous to that for regenerating the main cation exchanger $I_X$. The only difference is that only fresh regenerant fluid originating from the first regenerant fluid vessel $V_{RS1}$ or from the second regenerant fluid vessel $V_{RS2}$ and containing less than 1 ppm nickel ions is used. The regenerant fluid is preferably conducted only once through the safety cation exchanger Is before it is collected in the vessel $V_{RS1}$ and further used for regenerating the main cation exchanger $I_X$. The regenerant fluid remaining in the safety cation exchanger $I_S$ is displaced by wash water and also introduced into vessel $V_{RS1}$. The wash water used for driving the regenerant fluid out of the safety cation exchanger $I_S$ is recirculated back into the metal plating bath so that no additional waste water is generated.

For further explanation of the present invention, the way of functioning of a preferably utilized electrodialysis equipment E will be explained by way of example. In this regard, the reader is referred to FIG. 2:

FIG. 2 schematically illustrates the basic structure of the electrodialysis arrangements E1 and E2 in the simplest implementation. In the two cases, anodes An and cathodes Ka are housed in the corresponding anode compartments AR1, AR2 or in the corresponding cathode compartments KR1, KR2. These compartments contain an exchangeable electrolyte solution, preferably a sodium sulfate solution.

The anode or cathode compartments are separated from the adjacent electrolyte compartments by cation exchange membranes K. Such type membranes, like the other ion exchange membranes used, are freely available and are sold for example by DuPont de Nemours, U.S.A.

The diluate fluid flows through all of the diluate compartments Dixy (Di1a, Di2a, Di2b) and the concentrate fluid through all of the concentrate compartments Koxy (Ko1a, Ko1b, Ko2a) since both the diluate compartments Dixy and the concentrate compartments Koxy are hydraulically connected in parallel. This is schematically shown by arrows.

In the electrodialysis arrangement E1 schematically shown in the upper portion of the Figure, the anode compartment AR1 is adjoined with a first concentrate compartment Ko1a. The two compartments are separated by a cation exchange membrane K. The concentrate fluid flows through concentrate compartment Ko1a. On the cathode side, said first concentrate compartment is defined by an anion exchange membrane A. Toward the cathode Ka, the concentrate compartment Ko1a is adjoined with a diluate compartment Di1a through which the diluate fluid is circulated. On the cathode side, the diluate compartment Di1a is again adjoined with a concentrate compartment Ko1b through which the concentrate solution is circulated. The two compartments are separated from one another by a monoselective cation exchange membrane KS. The concentrate compartment Ko1b is separated from the adjacent cathode compartment KR1 by a cation exchange membrane K.

Sodium ions contained in the concentrate compartment Ko1a are not transferred into the diluate compartment Di1a. In the case of a typical nickel-phosphorus plating bath, the diluate solution contains ions of nickel, sodium, hypophosphite ($H_2PO_2^-$), orthophosphite ($HPO_3^{--}$), sulfate and carboxylic acid ($RCOO^-$). All of the anions of the ion species contained in the diluate compartment Di1a, i.e., the ions of hypophosphite, orthophosphite, sulfate and carboxylic acid, are transferred to the concentrate compartment Ko1a through the anion exchange membrane A and the singly charged sodium and $H_3O^+$ ions among the cations thereof, to the concentrate compartment Ko1b through the monoselective cation exchange membrane KS. By contrast, the doubly charged nickel ions are not transferred to the concentrate compartment Ko1b but remain in the diluate compartment. Small concentrations of hydroxide ions possibly contained in the concentrate compartment Ko1b cannot pass into the diluate compartment. The same applies to the ions of hypophosphite, orthophosphite, sulfate and carboxylic acid.

Accordingly, the end result obtained with the electrodialysis arrangement E1 is that all of the anions are transferred to the concentrate compartment whereas, among the cations, only the sodium and $H_3O^+$ ions pass into the concentrate compartment, the nickel ions do not.

In the electrodialysis arrangement E2 schematically shown in the lower portion of the Figure the anode compartment AR2 is adjoined with a first diluate compartment Di2b. On the cathode side, the anode compartment is defined by a cation exchange membrane K. The diluate fluid flows through said diluate compartment Di2b. On the cathode side, the diluate compartment Di2b is defined by a monoselective anion exchange membrane AS. On the cathode side of the diluate compartment, a concentrate compartment Ko2a through which the concentrate fluid is circulated adjoins. Said compartment is separated from a neighbouring second diluate compartment Di2a by an anion exchange membrane A. The diluate fluid is circulated through said diluate compartment. On the cathode side, said second diluate compartment Di2a is separated from the adjoining cathode compartment KR2 by means of a cation exchange membrane K.

Cations are not allowed to pass from the first diluate compartment Di2b into the adjacent concentrate compartment Ko2a since the two compartments are separated from one another by a monoselective anion exchange membrane AS. Likewise, sodium ions contained in the concentrate compartment cannot pass into the second diluate compartment Di2a because of an anion exchange membrane A that prevents the transfer of the sodium ions. Anions contained in the second diluate compartment Di2a, namely ions of hypophosphite, orthophosphite, sulfate, carboxylic acid and hydroxide are transferred into the central concentrate compartment Ko2a. Among the anions that have entered the concentrate compartment, but the singly charged anions, namely the ions of hypophosphite, carboxylic acid and hydroxide, are allowed to pass through the monoselective anion exchange membrane AS into the diluate compartment Di2b.

The end result of the partial processes taking place in this electrodialysis arrangement E2 is that the interfering bath constituents are selectively transferred into the concentrate compartment Ko2a whereas the active substances are recirculated back into the diluate solution once they have been passed across the concentrate compartment.

Any number of compartments Ko1y (Ko1a, Ko1b) and Di1y (Di1a) on the one hand and Ko2y (Ko2a) and Di2y (Di2a, Di2b) on the other hand can preferably be arranged to form a package.

It is understood that the examples and embodiments described herein are for illustrative purpose only and that various modifications and changes in light thereof as well as combinations of features described in this application will be suggested to persons skilled in the art and are to be included within the spirit and purview of the described invention and within the scope of the appended claims. All publications, patents and patent applications cited herein are hereby incorporated by reference.

Listing of Numerals
M metal plating bath tank
S rinse water tank
E, E1, E2 electrodialysis equipment/arrangements
$V_D$ diluate tank
$V_K$ collecting tank
$I_X$ main cation exchanger
$I_S$ safety cation exchanger
$V_{ZK}$ service reservoir
$V_{RS1}$ first regenerant fluid vessel
$V_{RS2}$ second regenerant fluid vessel
Koxy, Ko1y, Ko2y
Ko1a, Ko1b, Ko2a concentrate compartments
Dixy, Di1y, Di2y
Di1a, Di2a, Di2b diluate compartments
An anode
Ka cathode

The invention claimed is:

1. A device for regenerating an electroless metal plating bath, comprising:
   a) electrodialysis arrangements (E1, E2), each having diluate compartments (Di1y, Di2y) for holding the metal plating bath, concentrate compartments (Ko1y, Ko2y) that are separated from the diluate compartments (Di1y, Di2y) through ion exchange membranes and are intended to hold a concentrate fluid serving to adsorb interfering substances that are to be removed from the metal plating bath as well as anodes (An) and cathodes (Ka), and
   b) main cation exchangers ($I_x$) for removing metal ions from the concentrate fluid, said cation exchangers being coupled to the concentrate compartments (Ko1y, Ko2y) in such a manner that the concentrate fluid is allowed to be conducted through the main cation exchangers ($I_x$) and to be recirculated back into the concentrate compartments (Ko1y, Ko2y) by allowing the fluid to be circulated in a first circuit between the concentrate compartments (Ko1y, Ko2y) by allowing the fluid to be circulated in a first circuit between the concentrate compartments (Ko1y, Ko2y) and collecting tanks ($V_K$) and in a second circuit between the collecting tanks ($V_K$) and the main cation exchangers ($I_x$);

c) wherein said electrodialysis arrangements include:
  i) a first electrodialysis arrangement (E1) having alternating concentrate compartments (Ko1y) and diluate compartments (Di1y) as well as cathodes (Ka) and anodes (An), the diluate compartments (Di1y) being each separated on the cathode side thereof from a neighboring concentrate compartment (Ko1y) by a monoselective cation exchange membrane (KS) and on the anode side thereof from a neighboring concentrate compartment (Ko1y) by an anion exchange membrane (A), and
  ii) a second electrodialysis arrangement (E2) having alternating diluate compartments (Di2y) and concentrate compartments (Ko2y) as well as cathodes (Ka) and anodes (An), the concentrate compartments (Ko2y) being each separated on the cathode side thereof from a neighboring diluate compartment (Di2y) by anion exchange membrane (A) and on the anode side thereof from a neighboring diluate compartment (Di2y) by a monoselective anion exchange membrane (AS), so that the metal plating bath can be conducted simultaneously through all of the diluate compartments (Di1y, Di2y) in the two electrodialysis arrangements (E1, E2), the arrangements being connected in parallel, and the concentrate fluid being conducted through all of the concentrate compartments (Ko1y, Ko2y) in the two electrodialysis arrangements (E1, E2), and d) wherein said device includes current supplies (S) for the cathodes (Ka) and the anodes (An) of the first electrodialysis arrangement (E1) and of the second electrodialysis arrangement (E2); and e) wherein the volume streams of fluid to be circulated between the electrodialysis arrangements and the collecting tanks on the one side and between the collecting tanks in the main cation exchangers on the other side are adjusted independently of each other.

2. The device according to claim 1, wherein first regenerant fluid vessels ($V_{RS1}$) for holding regenerant fluid intended for the regenerations of the main cation exchangers ($I_x$) are further provided, said vessels being coupled to the main cation exchangers ($I_x$).

3. The device according to claim 1, wherein service reservoirs ($V_{ZK}$) for holding concentrate fluid are further provided, said reservoirs being coupled to the collecting tanks ($V_K$) and to the main cation exchangers ($I_x$).

4. The device according to claim 1, wherein safety cation exchangers ($I_S$) are further provided, said exchangers being coupled to the main cation exchangers ($I_S$) are further provided, said exchangers being coupled to the main cation exchangers ($I_x$) for post-treatment of the concentrate fluid treated in the main cation exchangers ($I_x$).

5. The device according to claim 1, wherein second regenerant fluid vessels ($V_{RS2}$) for holding regenerant fluid intended for the regeneration of the safety cation exchangers ($I_S$) are provided.

6. The device according to claim 1, wherein first regenerant fluid vessels ($V_{RS1}$) for holding regenerant fluid intended for the regenerations of the main cation exchangers ($I_x$) are further provided, said vessels being coupled to the main cation exchangers ($I_x$).

7. The device according to claim 1, wherein service reservoirs ($V_{ZK}$) for holding concentrate fluid are further provided, said reservoirs being coupled to the collecting tanks ($V_K$) and to the main cation exchangers ($I_x$).

8. The device according to claim 1, wherein safety cation exchangers ($I_S$) are further provided, said exchangers being coupled to the main cation exchangers ($I_S$) are further provided, said exchangers being coupled to the main cation exchangers ($I_x$) for post-treatment of the concentrate fluid treated in the main cation exchangers ($I_x$).

9. The device according to claim 1, wherein second regenerant fluid vessels ($V_{RS2}$) for holding regenerant fluid intended for the regeneration of the safety cation exchangers ($I_S$) are provided.

10. A method for regenerating an electroless metal plating bath, comprising:
  a) conducting the metal plating bath through the respective diluate compartments (Di1y, Di2y) of electrodialysis arrangements (E1, E2) and
  b) conducting a concentrate fluid, serving to adsorb interfering substances that are to be removed from the metal plating bath, through respective concentrate compartments (Ko1y, Ko2y) of the electrodialysis arrangements (E1, E2), said concentrate compartments being separated from the diluate compartments (Di1y, Di2y) by ion exchange membranes,
  c) moreover passing the concentrate fluid through main cation exchangers ($I_x$) and recirculating the fluid back into the concentrate compartments (Ko1y, Ko2y) by circulating the concentrate fluid in a first circuit between the concentrate compartments (Ko1y, Ko2y) and collecting tanks ($V_k$) and in a second circuit between the collecting tanks and the main cation exchangers ($I_x$).
  d) wherein the metal plating bath is conducted through diluate compartments (Di1y) in a first electrodialysis arrangement (E1) comprising alternating concentrate compartments (Ko1y) and diluate compartments (Di1y) as well as cathodes (Ka) and anodes (An), the diluate compartments (Di1y) being each separated on the cathode side thereof from a neighboring concentrate compartment (Ko1y) by a mono selective cation exchange membrane (KS) and on the anode side thereof from a neighboring concentrate compartment (Ko1y) by an anion exchange membrane (A),
  e) wherein the metal plating bath is conducted through diluate compartments (Di2y) in a second electrodialysis arrangement (E2) comprising alternating the diluate compartments (Di2y) and concentrate compartments (Ko2y) as well as cathodes (Ka) and anodes (An), the concentrate compartments (Ko2y) being each separated on the cathode side thereof from a neighboring diluate compartment (Di2y) by an anion exchange membrane (A) and on the anode side thereof from a neighboring diluate compartment (Di2y) by a monoselective anion exchange membrane (AS), and
  f) wherein the metal plating bath is simultaneously conducted through all of the diluate compartments (Di1y, Di2y) in the two electrodialysis arrangements (E1, E2), the arrangements being connected in parallel, and the concentrate fluid being conducted through all of the concentrate compartments (Ko1y, Ko2y) in the two electrodialysis equipments (E1, E2); and
  g) wherein the volume streams of fluid to be circulated between the electrodialysis arrangements and the collecting tanks on the one side and between the collecting tanks in the main cation exchangers on the other side are adjusted independently of each other.

11. The method according to claim 10, wherein, for regenerating the main cation exchangers ($I_x$), concentrate fluid contained in the main cation exchangers ($I_x$) is displaced by a regenerant fluid and is recirculated back into the collecting tanks ($V_K$), the main cation exchangers ($I_x$) being regenerated in the process.

12. The method according to claim 11, wherein concentrate fluid flows through several main cation exchangers ($1_x$) at different times with the regenerant fluid being circulated through those main cation exchangers ($I_x$) through which the concentrate fluid is not circulating for regeneration thereof.

13. The method according to claim 11, wherein the regenerant fluid is drawn from first regenerant fluid vessels ($V_{RS1}$) and is transferred to the main cation exchangers ($I_x$).

14. The method according to claim 13, wherein the regenerant fluid is displaced by the concentrate fluid after regeneration of the main cation exchangers ($I_x$) is complete, the regenerant fluid being recirculated back into first regenerant fluid vessels ($V_{RS1}$).

15. The method according to claim 13, wherein concentrate fluid flows through several main cation exchangers ($1_x$) at different times regenerant fluid being circulated through those main cation exchangers ($I_x$) through which the concentrate fluid is not circulating for regeneration thereof.

16. The method according to claim 11, wherein the regenerant fluid is displaced by the concentrate fluid after regeneration of the main cation exchangers ($I_x$) is complete, the regenerant fluid being recirculated back into first regenerant fluid vessels ($V_{RS1}$).

17. The method according to claim 10, wherein concentrate fluid flows through several main cation exchangers ($1_x$) at different times with the regenerant fluid being circulated through those main cation exchangers ($I_x$) through which the concentrate fluid is not circulating for regeneration thereof.

18. The method according to claim 10, wherein, for regenerating the main cation exchangers ($I_x$), concentrate fluid contained in the main cation exchangers ($I_x$) is displaced by a regenerant fluid and is recirculated back into the collecting tanks ($V_K$), the main cation exchangers ($I_x$) being regenerated in the process.

\* \* \* \* \*